(12) United States Patent
Erickson et al.

(10) Patent No.: US 8,459,033 B2
(45) Date of Patent: Jun. 11, 2013

(54) SYSTEMS AND METHODS FOR MODIFIED WOBBE INDEX CONTROL WITH CONSTANT FUEL TEMPERATURE

(75) Inventors: Dean Matthew Erickson, Greenville, SC (US); Brian Gallagher, Greenville, SC (US); Mihir Lal, Greenville, SC (US); Scott Day, Greenville, SC (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 13/176,017

(22) Filed: Jul. 5, 2011

(65) Prior Publication Data

US 2013/0008172 A1 Jan. 10, 2013

(51) Int. Cl.
*F02C 7/08* (2006.01)
(52) U.S. Cl.
USPC .............................. 60/736; 60/772
(58) Field of Classification Search
USPC .............. 60/736, 39.281, 772, 730, 734, 776, 60/266
See application file for complete search history.

(56) References Cited

U.S. PATENT DOCUMENTS

| | | | |
|---|---|---|---|
| 4,498,525 A * | 2/1985 | Smith | 165/287 |
| 5,617,716 A * | 4/1997 | Schreiber et al. | 60/775 |
| 5,845,481 A * | 12/1998 | Briesch et al. | 60/776 |
| 6,082,092 A * | 7/2000 | Vandervort | 60/773 |
| 6,401,459 B1 * | 6/2002 | Tiras | 60/772 |
| 7,905,082 B2 * | 3/2011 | Estrada et al. | 60/39.511 |
| 2010/0162708 A1 | 7/2010 | Erickson et al. | |
| 2010/0205977 A1 | 8/2010 | Annigeri et al. | |
| 2010/0275609 A1 | 11/2010 | Snider | |
| 2010/0307157 A1 | 12/2010 | Bilton et al. | |
| 2010/0307158 A1 | 12/2010 | Bilton et al. | |
| 2010/0319359 A1 | 12/2010 | Holt et al. | |
| 2011/0041504 A1 | 2/2011 | Estrada et al. | |

OTHER PUBLICATIONS

U.S. Appl. No. 12/712,728, filed Feb. 25, 2010, Erickson, et al.

* cited by examiner

*Primary Examiner* — Phutthiwat Wongwian
(74) *Attorney, Agent, or Firm* — Sutherland Asbill & Brennan LLP

(57) ABSTRACT

The present application provides a gas turbine engine system for combusting a flow of fuel. The gas turbine engine system may include a combustor and a fuel system for providing the flow of fuel to the combustor. The fuel system may include a fuel heat exchanger so as to provide the flow of fuel to the combustor at a substantially constant temperature.

15 Claims, 2 Drawing Sheets

SYSTEMS AND METHODS FOR MODIFIED WOBBE INDEX CONTROL WITH CONSTANT FUEL TEMPERATURE

TECHNICAL FIELD

The present application and the resultant patent relate generally to gas turbine engines and more particularly relate to systems and methods for Modified Wobbe Index control using a fuel heat exchanger to deliver fuel to a combustor with a constant temperature.

BACKGROUND OF THE INVENTION

Generally described, gas turbine engines are designed to operate with fuels having certain characteristics relating to heating values. The heating value of the fuel may be referred to as the gross caloric value, the gross energy, or the Wobbe Index rating. The heating value generally describes the amount of heat or energy released when the fuel is combusted. The amount of energy released by a fuel being combusted through a fuel nozzle at a given pressure ratio may be more accurately described if the temperature at which the fuel is delivered to the nozzle is taken into account. Such a fuel characteristic may be known as the Modified Wobbe Index rating or MWI rating. Gas turbine engines therefore are designed to operate with fuels that have a specific Modified Wobbe Index rating or with fuels that fall within a range of acceptable Modified Wobbe Index ratings.

The ability to modify or control the temperature of the fuel being delivered to the combustor so as to modify or control the Modified Wobbe Index rating is useful to ensure that the gas turbine engine is using acceptable fuels that promote efficient operation and reduce the risk of combustor damage. Known methods of controlling the incoming fuel temperature generally focus on maintaining the fuel temperature within a given range based upon the varying constituents of the fuel flow. Complex instruments such as gas chromatographs and various types of feedback controls thus may be required to determine the constituents in the fuel and adjust the temperature range accordingly. Moreover, different types of equipment may be used at different stages of operation, i.e., startup, shutdown, other transient events, and steady state. As a result, accurate Modified Wobbe Index rating control may be difficult and/or expensive.

There is therefore a desire for improved systems and methods for adequate Modifying Wobbe Index control without the complexity and expense of known systems. Such improved systems and methods may ensure adequate Modified Wobbe Index control and, hence, adequate overall system performance without requiring complex feedback mechanism and the like.

SUMMARY OF THE INVENTION

The present application and the resultant patent thus provide a gas turbine engine system for combusting a flow of fuel. The gas turbine engine system may include a combustor and a fuel system for providing the flow of fuel to the combustor. The fuel system may include a fuel heat exchanger so as to provide the flow of fuel to the combustor at a substantially constant temperature.

The present application and the resultant patent further provide a method of operating a gas turbine with Modified Wobbe Index control without evaluating the constituents of an incoming flow of fuel. The method may include the steps of determining the temperature of the incoming flow of fuel, heating or cooling the flow of fuel to a target temperature, and delivering the flow of fuel to a combustor at the target temperature.

The present application and the resultant patent further provide a gas turbine engine system for combusting a flow of fuel. The gas turbine engine system may include a combustor, a fuel line for providing the flow of fuel to the combustor, a temperature element for determining a temperature of the flow of fuel, and a fuel heat exchanger so as to provide the flow of fuel to the combustor substantially at a target temperature.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
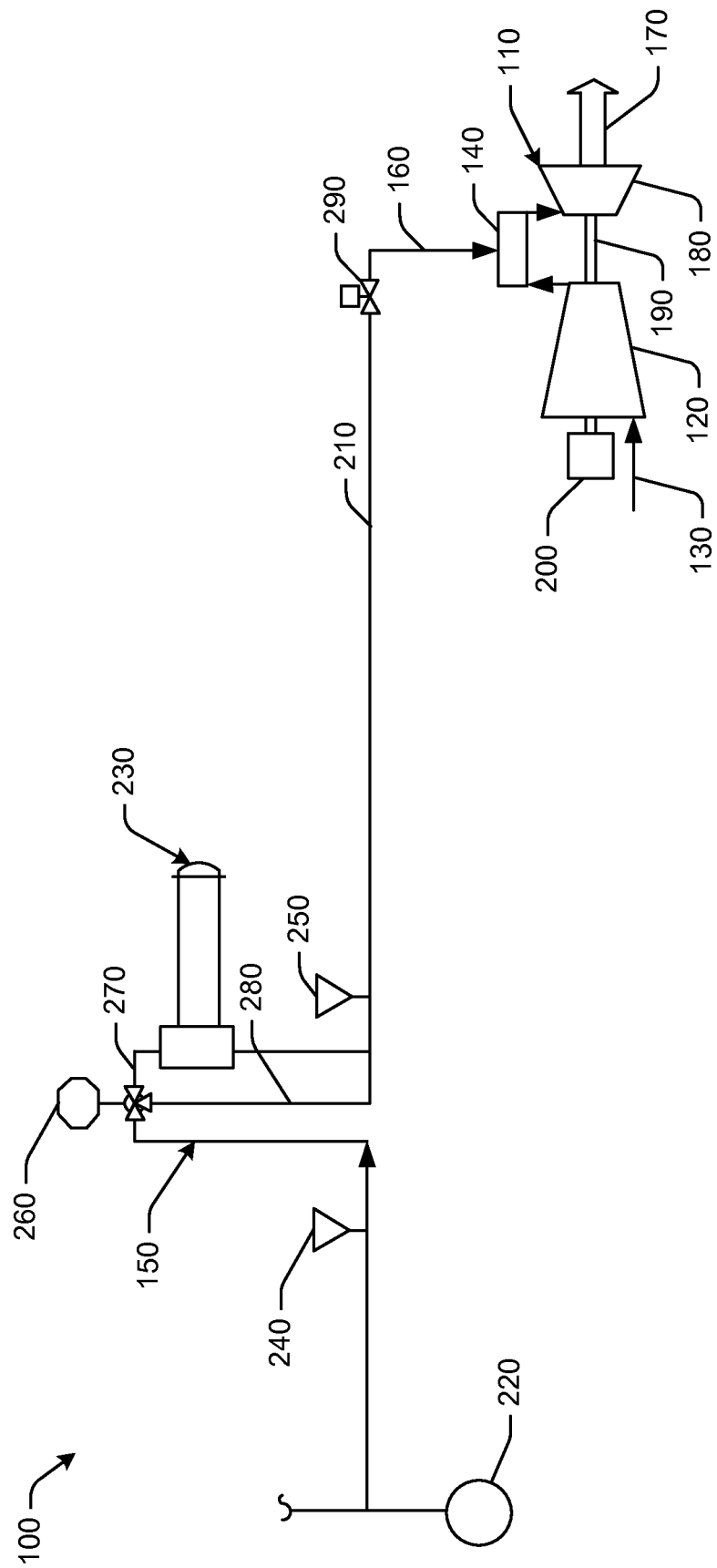
FIG. 1 is a schematic view of a gas turbine engine system with constant fuel temperature control.

Referring now to the drawings in which like numerals refer to like elements throughout the several views, FIG. 1 shows a gas turbine engine system 100 as may be described herein. The gas turbine engine system 100 may include one or more gas turbine engines 110. Each gas turbine engine 110 may include a compressor 120. The compressor 120 compresses an incoming flow of air 130. The compressor 120 delivers the compressed flow of air 130 to a combustor 140. A fuel system 150 likewise delivers a compressed flow of fuel 160 to the combustor 140. The combustor 1140 mixes the compressed flow of air 130 and the compressed flow of fuel 160 and ignites the mixture to create a flow of combustion gases 170. Although only a single combustor 140 is shown, the gas turbine engine 110 may include any number of combustors 140. The flow of combustion gases 170 is in turn delivered to a turbine 180. The flow of combustion gases 170 drives the turbine 180 so as to produce mechanical work. The mechanical work produced in the turbine 180 drives the compressor 120 via a shaft 190 and external load 200 such as an electrical generator and the like.

The gas turbine engine 110 may use natural gas, various types of syngas, and/or other types of fuels. The gas turbine engine 110 may be any one of a number of different gas turbine engines offered by General Electric Company of Schenectady, N.Y. The gas turbine engine 110 may have different configurations and may use other types of components. Other types of combustion engines also may be used herein. Multiple gas turbine engines, other types of turbines, and other types of power generation equipment also may be used herein together.

As described above, the gas turbine engine system 100 also includes the fuel system 150 for delivering the flow of fuel 160 to the combustor 140. The fuel system 150 may include an incoming fuel line 210. Multiple fuel lines 210 may be used herein. The fuel line 210 may be in communication with a fuel source 220. The fuel source 220 may have any size, shape, or configuration. The flow of fuel 160 from the fuel source 220 may have varying constituents and temperatures. Specifically, the flow of fuel 160 may have differing hydrocarbons therein with differing heating values for differing Modified Wobbe Index values and differing specific gravities.

The fuel system 150 may include a fuel heat exchanger 230 positioned on the fuel line 210. The fuel heat exchanger 230 may be any type of device that may heat or cool the flow of fuel 160 such that the flow of fuel 160 has a constant temperature after passing therethrough. The fuel heat exchanger 230 thus may provide heating, cooling, and/or both. The fuel heat exchanger 230 may be controllable for a desired constant fuel temperature. The desired constant fuel temperature may be predetermined and may vary based upon operating conditions and other variables as opposed to the constituents of the flow of fuel 160. As will be described in more detail below, any type of heat exchange device and the like may be used herein so as to maintain the constant temperature. Preferably, the fuel heat exchanger 230 heats the flow of fuel 160 without use of the combustion gases 170 from the turbine 180 so as to provide more accurate temperature control.

A first temperature sensor or temperature element 240 may be positioned upstream of the fuel heat exchanger 230 so as to determine the temperature of the incoming flow of fuel 160. Likewise, a second temperature sensor or temperature element 250 may be positioned downstream of the fuel heat exchanger 230 to ensure that a constant temperature output is entering the combustor 140. Other types of sensors, components, and configurations may be used herein.

A temperature control valve to 260 may be positioned upstream of the fuel heat exchanger 230. The temperature control valve 260 may be a conventional three-way valve and the like so as to split the flow of fuel 160 into a fuel heat exchanger line 270 and/or a bypass line 280. Other lines also may be used herein. Based upon the incoming temperature of the flow of fuel 160 as determined by the first temperature element 240 and the outgoing temperature of the flow of fuel 160 as determined by the second temperature element 250, the temperature control valve 260 may vary the volume of the flow of fuel 160 as delivered to the fuel heat exchanger 230 via the fuel heat exchanger line 270 and the volume that may bypass the fuel heat exchanger 230 via the bypass line 280 or otherwise. The bypass line 280 may merge with the fuel line 210 downstream of the fuel heat exchanger 230. Other components and other configurations may be used herein.

A gas control valve 290 also may be positioned on the fuel line 210 near the combustor 140. The gas control valve 290 may control the volume or flow rate of the flow of fuel 160 entering the combustor 140. Other components and other configurations may be used herein.

Figure 2:
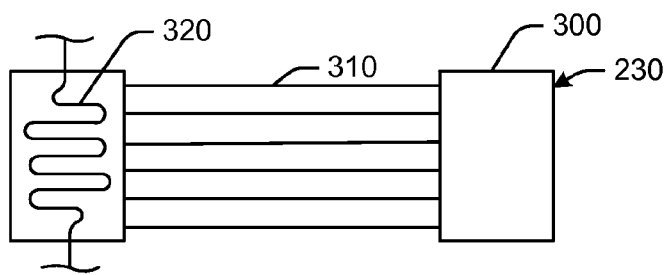
FIG. 2 is an alternative embodiment of a fuel heat exchanger as may be described herein.

As described above, the fuel heat exchanger 230 may be any device that maintains the flow of fuel 160 at a constant temperature after passing therethrough. As such, the fuel heat exchanger 230 may be an electric heater 300 as is shown in FIG. 2. Generally described, the electric heater 300 may include one or more electric heating elements 310 in communication with a heat exchanger portion 320 having the flow of fuel 160 therethrough. The electric heater 300 thus may heat the flow of fuel 160 without using exhaust heat from the turbine 180 or other source. Other components and other configurations may be used herein.

Figure 3:
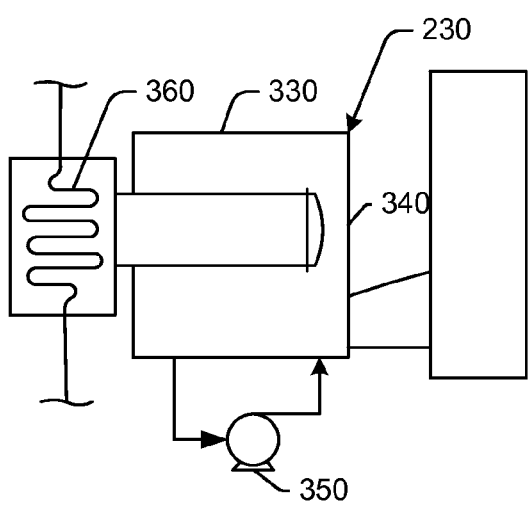
FIG. 3 is an alternative embodiment of a fuel heat exchanger as may be described herein.

As is shown in FIG. 3, the fuel heat exchanger 230 also may include an oil or water bath heater 330. As the name implies, the oil or water bath heater 330 may circulate heated oil, water, or other medium in a bath 340 via a pump 350 so as to heat the flow of fuel 160 in a heat exchange portion 360. Other components and other configurations may be used herein.

Figure 4:
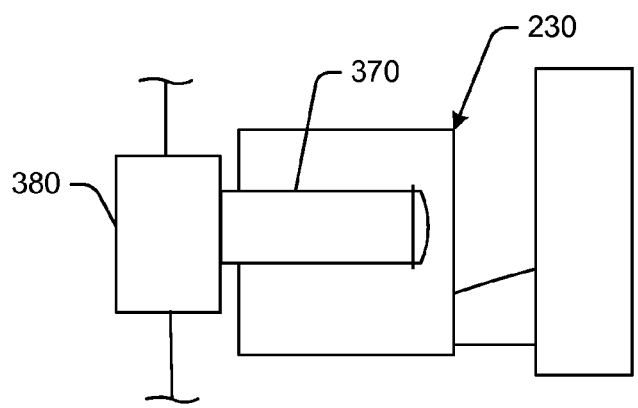
FIG. 4 is an alternative embodiment of a fuel heat exchanger as may be described herein.

As is shown in FIG. 4, the fuel heat exchanger 230 also may include a direct fired heater 370. The direct fire heater 370 may combust a supply of fuel so as to heat the flow of fuel 160 in a heat exchange portion 380. Other components and other configurations may be used herein.

Figure 5:
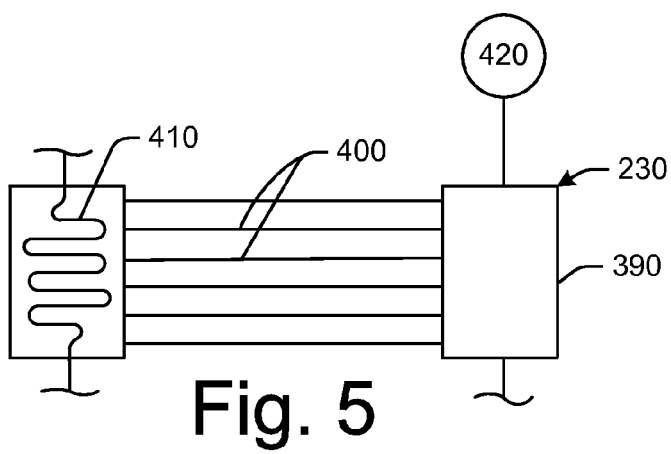
FIG. 5 is an alternative embodiment of a fuel heat exchanger as may be described herein.

FIG. 5 shows the fuel heat exchanger 230 as a heat pipe heat exchanger 390. The heat pipe heat exchanger 390 may have multiple conductive pipes 400 in communication with a heat exchange portion 410. The conductive pipes 400 may be in communication with a heat source 420. The heat source 420 may be any type of heat source including the flow of combustion gases 170 as well as a number of different sources such as a heat recovery steam generator used in a combined cycle system and the like. Such a heat source 420 thus may provide differing temperatures as needed. Other components and other configurations may be used herein.

In use, the fuel system 150 provides the flow of fuel 160 to the combustor 140 at a constant temperature. The constant temperature may be selected to ensure that the Modified Wobbe Index value of the flow of fuel 160 stays within an acceptable range despite varying constituents and temperatures of the flow of fuel 160 upstream of the fuel heat exchanger 230. As such, the flow of fuel 160 leaving the fuel heat exchanger 230 still may have varying constituents, but maintains a constant temperature. The gas fuel exchanger 230 thus provides heating and/or cooling to the flow of fuel if the incoming flow of fuel 160 varies above or below the target temperature. The fuel system 150 ensures that the flow of fuel 160 maintains Modified Wobbe Index value requirements without complex monitoring and/or feedback mechanisms. The fuel system 150 described herein thus provides increase reliability and availability for improves efficiency and performance.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine system for combusting a flow of fuel, comprising:
   a combustor; and
   a fuel system, comprising:
      a fuel line configured to provide the flow of fuel to the combustor;
      a fuel heat exchanger positioned on the fuel line, wherein the fuel heat exchanger is configured to provide the flow of fuel to the combustor at a substantially constant temperature to maintain a Modified Wobbe Index (MWI) of the flow of fuel within a desired range;
      a temperature control valve positioned on the fuel line upstream of the fuel heat exchanger, wherein the temperature control valve divides the fuel line into a bypass line and a heat exchanger line such that the flow of fuel in the bypass line bypasses the fuel heat exchanger and the flow of fuel in the heat exchanger line is directed to the heat exchanger, and wherein the bypass line and the heat exchanger line merge together downstream of the heat exchanger to reform the fuel line;
      a first temperature sensor positioned on the fuel line upstream of the temperature control valve;

a second temperature sensor positioned on the fuel line downstream of the merger of the bypass line and the heat exchanger line, wherein the temperature control valve is configured to control the fuel based on temperatures from the first and second sensors; and a gas control valve positioned downstream of the second temperature sensor and upstream of the combustor, wherein the gas control valve is configured to control the volume or flow rate of the flow of fuel entering the combustor.

2. The gas turbine engine system of claim 1, wherein the fuel heat exchanger comprises an electric heater.

3. The gas turbine engine system of claim 2, wherein the electric heater comprises one or more heating elements and a heat exchanger portion.

4. The gas turbine engine system of claim 1, wherein the fuel heat exchanger comprises an oil or water bath heater.

5. The gas turbine engine system of claim 1, wherein the fuel heat exchanger comprises a direct fired heater.

6. The gas turbine engine system of claim 1, wherein the fuel heat exchanger comprises a heat pipe heat exchanger.

7. The gas turbine engine system of claim 6, wherein the heat pipe heat exchanger comprises a plurality of conductive pipes in communication with a heat exchange portion.

8. The gas turbine engine system of claim 1, wherein the fuel heat exchanger is in communication with a heat source.

9. The gas turbine engine system of claim 8, wherein the heat source comprises heat utilized from a source other than combustion gases exiting the combustor.

10. A method of operating a gas turbine with Modified Wobbe Index control without evaluating the constituents of an incoming flow of fuel, comprising:
determining a first temperature of the incoming flow of fuel with a first temperature, sensor positioned on a fuel line upstream of a temperature control valve;
providing at least a portion of the incoming flow of fuel to a fuel heat exchanger by way of the temperature control valve, wherein the a temperature control valve is positioned on the fuel line upstream of the fuel heat exchanger, wherein the temperature control valve divides the fuel line into a bypass line and a heat exchanger line to control the fuel based on the first temperature and a second temperature downstream of the bypass line, and wherein the bypass line and the heat exchanger line merge together downstream of the heat exchanger to reform the fuel line;
bypassing at least a portion of the incoming flow of fuel from the heat exchanger by way of the bypass line;
heating or cooling the flow of fuel with the fuel heat exchanger to a substantially constant temperature to maintain a Modified Wobbe Index (MWI) of the flow of fuel within a desired range; and
delivering the flow of fuel to a combustor at the substantially constant temperature by way of a gas control valve positioned on the fuel line downstream of the merger of the bypass line and the heat exchanger line and upstream of the combustor, wherein the gas control valve is configured to control the volume or flow rate of the flow of fuel entering the combustor.

11. A gas turbine engine system for combusting a flow of fuel, comprising:
a combustor; and
a fuel system, comprising:
a fuel line configured to provide the flow of fuel to the combustor;
a fuel heat exchanger positioned on the fuel line, wherein the fuel heat exchanger is configured to provide the flow of fuel to the combustor at a substantially constant temperature to maintain a Modified Wobbe Index (MWI) of the flow of fuel within a desired range;
a temperature control valve positioned on the fuel line upstream of the fuel heat exchanger, wherein the temperature control valve divides the fuel line into a bypass line and a heat exchanger line such that the flow of fuel in the bypass line bypasses the fuel heat exchanger and the flow of fuel in the heat exchanger line is directed to the heat exchanger, and wherein the bypass line and the heat exchanger line merge together downstream of the heat exchanger to reform the fuel line;
a first temperature sensor positioned on the fuel line upstream of the temperature control valve, wherein the temperature control valve is configured to control the fuel based on temperatures from the first sensor and a second sensor downstream of the bypass line; and
a gas control valve positioned on the fuel line downstream of the merger of the bypass line and the heat exchanger line and upstream of the combustor, wherein the gas control valve is configured to control the volume or flow rate of the flow of fuel entering the combustor.

12. The gas turbine engine system of claim 11, wherein the fuel heat exchanger comprises an electric heater.

13. The gas turbine engine system of claim 11, wherein the fuel heat exchanger comprises an oil or water bath heater.

14. The gas turbine engine system of claim 11, wherein the fuel heat exchanger comprises a direct fired heater.

15. The gas turbine engine system of claim 11, wherein the fuel heat exchanger comprises a heat pipe heat exchanger.

* * * * *